(12) United States Patent
Pusch (10) Patent No.: US 6,953,257 B2
(45) Date of Patent: Oct. 11, 2005

(54) OUTDOOR LIGHT MOUNTING SYSTEM

(76) Inventor: Allen A. Pusch, Box 15, SITE 4, R.R. #8, Calgary Province of Alberta (CA), T2J 2T9

( * ) Notice: Subject to any disclaimer, the term of this patent is extended or adjusted under 35 U.S.C. 154(b) by 44 days.

(21) Appl. No.: 10/782,818

(22) Filed: Feb. 23, 2004

(65) Prior Publication Data

US 2004/0165394 A1 Aug. 26, 2004

(51) Int. Cl.⁷ ............................................ F21V 111/023
(52) U.S. Cl. .................... 362/153.1; 362/153; 362/410
(58) Field of Search ............................. 362/153, 153.1, 362/410, 431, 414

(56) References Cited

U.S. PATENT DOCUMENTS

| | | | |
|---|---|---|---|
| 4,143,413 A | | 3/1979 | Kelly |
| 4,858,877 A | | 8/1989 | Carter |
| 5,260,860 A | * | 11/1993 | Jordan et al. ................ 362/431 |
| 5,414,607 A | * | 5/1995 | Harris et al. ................ 362/362 |
| 5,586,742 A | | 12/1996 | Carter |
| 6,183,112 B1 | * | 2/2001 | Bomas ........................ 362/285 |
| 6,386,729 B1 | * | 5/2002 | Bober ....................... 362/153.1 |
| 6,398,391 B1 | * | 6/2002 | Huang ......................... 362/431 |
| 6,530,675 B1 | * | 3/2003 | Van Etten .................... 362/267 |
| 6,585,221 B1 | * | 7/2003 | Gretz .......................... 248/545 |
| 2002/0191391 A1 | | 12/2002 | Van Etten |

* cited by examiner

Primary Examiner—Laura K. Tso
(74) Attorney, Agent, or Firm—John C. Kerins (57) ABSTRACT

An installation system for mounting outdoor lighting wherein there is provided a foundation member in the form of a mildly compressible pipe member which is mounted in the ground, and an adapter which may form an electrical connection box. A light standard can be mounted on the adapter which has a lower portion, at least a portion of the outer surface of the lower section being in the form of a section of a sphere for close reception in an open upper end of the pipe member. The adapter within the pipe member provides adjustment movement in a ball and socket fashion so that regardless of whether the pipe member is not accurately installed in the ground, the adapter can be moved to achieve vertical orientation of the light standard prior to clamping of the pipe member to prevent further relative movement between the standard and its foundation member.

10 Claims, 9 Drawing Sheets

OUTDOOR LIGHT MOUNTING SYSTEM

FIELD OF INVENTION

This invention relates to a system for use in installing outdoor lighting, and more particularly to an adapter which provides for adjustment to achieve accurate vertical mounting of a standard of an outdoor light.

BACKGROUND OF INVENTION

Outdoor lights of the type including some form of light fixture affixed to the top of a post or other form of a standard extending up from a base portion, all of which are usually pre-wired, are in common use in residential yards, beside drives, walkways and the like as well as in various commercial areas for lighting purposes and to enhance the landscaping. A large portion of such outdoor lighting units are installed before or after the completion of landscaping in housing and other building development projects.

One procedure commonly followed is for a contractor, before final landscaping, to rough in the site by digging trenches for the wiring, to pour concrete bases in which the electrical connection boxes are cemented in, to run in the required wiring, and to mount the outdoor lights. With this approach damage may be done to the lighting unit or the mounting base may be displaced during subsequent landscaping, and an even more serious problem is that after final grading of the soil, the elevation of each of the already installed outdoor lighting units may not be correct.

Because of the above indicated problem, another common approach is to do the complete installation of outdoor lighting after the completion of the landscaping and the final grade is established. This involves additional work in that considerable extra excavation is required in digging the wiring trenches and base areas for locating the base of each lighting unit. Moreover, a significant amount of the landscaping must be redone on completion of the installation of the lights.

Moreover, there is a growing demand for outdoor lighting of a type which would facilitate a simple installation of outdoor lighting by the home owner. In some areas regulations exist with less stringent requirements for certain structural and electrical features in the installing of outdoor lighting. For example, it is possible in such areas to utilize 12V supply in wires which need not be trenched in to the extent of more common outdoor wiring regulations.

SUMMARY OF THE INVENTION

It is an object of the invention to provide a system which permits a more economical manner of installing outdoor lighting.

It is a further object of the present invention to provide an adapter for use with other readily commercially available parts, including inexpensive light fixtures, particularly suited for installation of outdoor lighting by home owners.

It is another object of the present invention to provide an electrical connection box which provides for adjustment of the vertical positioning of an outdoor light standard on installation.

It is another object of the present invention to provide an adapter for use in installing an outdoor light standard in a correctly oriented position by a person without particular skills or special equipment.

It is yet a further object of the present invention to allow the mounting of an outdoor light standard in a manner to permit deflection and the subsequent re-adjustment of the light standard if struck by a force which would otherwise damage the light standard.

According to one aspect of the present invention there is provided an adapter for use in an upper end of a supporting pipe member embedded within the ground and providing a foundation for a standard of an outdoor light fixture above ground surface. The pipe with which the adapter may be used can be of a commercially available type, as long as it is capable of providing an open upper end defined by an inner surface of a mildly compressible circular wall. The adapter includes an integrated body having an upper portion and a lower portion both disposed about a central axis. The lower portion provides an outer surface defined at least in part by a section of a profile of a sphere having its center on the central axis of the body and a radius substantially equal to a radius of the inner surface of the open upper end of the pipe. The upper portion provides a mounting surface accessibly from above ground for cooperative engagement with the standard of the light fixture for attachment of the standard to the adapter. Accordingly, on applying a clamping force about the upper end of the pipe, subsequent to inserting the lower portion of the adapter into the upper end of the pipe and then adjusting the central axis of the body of the adapter relative to the central axis of the pipe, the central axis of the adapter is fixed in a desired position relative to the pipe for thereby holding the light fixture standard in its desired upright position.

A preferred form of this adapter has a central opening extending therethrough for the passage of electrical wires from the interior of the pipe and into the interior of the standard of the light fixture.

In one form of the invention the upper portion of the body of the adapter includes flange means with at least portions of the flange extending radially outward from the central axis an extent greater than the outer surface of the lower portion.

The central opening in the upper portion of the adapter in one form of the invention may be internally threaded for reception of a threaded lower portion of the standard of the light.

According to another aspect of the invention, there is provided a mounting system for an outdoor light standard of the type including a post affixed to and extending upwardly from a bottom horizontal base portion, the system including an elongated pipe member for installing below ground surface in a position having a longitudinal axis disposed in an approximate vertical orientation. The pipe member has at least one subsurface opening for receiving electrical wires and an open upper is defined by an inner surface of a mildly compressible, circumferential wall of the pipe member. There is further provided a box unit for electrical connections, the box having a lower portion for reception in the open upper end of the pipe member and an upper portion disposed above the upper end of the pipe member. The lower portion of the box unit has an exterior circumferential surface for close engagement within the inner surface of the wall of the pipe member, and the upper portion of the box unit has an exposed upper surface providing a horizontal face for supporting the base portion of the light standard. Also included is universal connection means providing for adjustment of a vertical axis of the upper portion of the box unit relative to the longitudinal axis of the pipe member. A locking means is used to hold the upper portion of the box unit relative to an adjusted position relative to the longitudinal axis of the pipe member. Thus, the vertical axis of the upper portion of the box unit can be locked after adjustment in a fixed position relative to the longitudinal axis of the pipe member for holding the upper surface of the upper portion of the box unit in a horizontal plane regardless of the pipe member having been installed with the longitudinal axis thereof deviating from the vertical.

Another aspect of the invention resides in an electrical connection box for use in a mounting system for an outdoor light standard of the type including a post secured to and extending upwardly from a bottom flange, the mounting system including a rigid pipe member for installation within the ground, the pipe member having a longitudinal central axis and an open upper end defined by an inner surface of a mildly compressible circular wall of the pipe member. In this type of system a clamp means is used to encircle and compress the circular wall of the upper end of the pipe member after installation of the connection box. The connection box of the invention is in the form of an integral unit formed of a lower hollow portion and an upper portion terminating in an upper flange defining a flat surface in a plane normal to a central longitudinal vertical axis of the connection box for supporting and attachment to the bottom flange of the light standard. The lower portion of the connection box includes an outer wall providing an outer surface profile defined at least in part by a section of a sphere having a center on the vertical axis of the connecting box and a radius substantially equal to that of the inner surface of the circular wall of the pipe member. Thus, upon reception of the lower portion of the connection box in the open end of the pipe member, the lower portion can be oriented to a set position through a universal type movement of the lower portion of the box within the pipe member wherein the longitudinal axis of the box is at an angle relative to the longitudinal axis of the pipe member thereby resulting in the flat surface of the upper flange being horizontally disposed. This being possible prior to tightening the clamp means. Thus, the clamping compresses the wall of the upper end of the pipe member about the outer surface of the lower portion of the box so as to resist movement of the connector box from its set position relative to the pipe member.

The invention also resides in a method of preparing a mounting system for supporting an outdoor light standard of the type having a base defining a horizontal bottom face, the method including the steps of affixing at least a lower end of an elongated pipe member within the ground base with an axis of the pipe member in a generally vertical orientation, the pipe member having at least one opening in a lower part thereof for receiving electrical wiring, and then inserting a lower portion of an electrical connection box into an open upper end of the pipe member in a close fitting arrangement, the box having an upper portion defining a flat surface normal to a central axis of the upper portion for supporting the bottom face of the light standard. According to this method, the upper portion of the box is adjusted relative to the pipe member to vertically position the central axis of the upper portion of the box, after which, the upper portion of the box is locked relative to the pipe member with the central axis of the upper portion being vertically positioned. Electrical wiring means fed through the lower opening in the pipe member and through a sealable opening in a bottom of the connection box is available for mounting the light standard on the flat surface of the upper portion of the box.

In the above method, preferably prior to final landscaping in an area to be provided with the outdoor lighting, the pipe member is initially installed approximately in a vertical position in the ground base with a length in excess so that a top portion of the pipe protrudes above an expected final grade, and subsequently, the upper end of the pipe member is trimmed at a level of final grade of landscaping prior to inserting the connection box into the open upper end of the pipe member.

BRIEF DESCRIPTION OF DRAWINGS

In the accompanying drawings which show embodiments of the invention as examples of the invention.

DETAILED DESCRIPTION OF THE INVENTION

Figure 1:
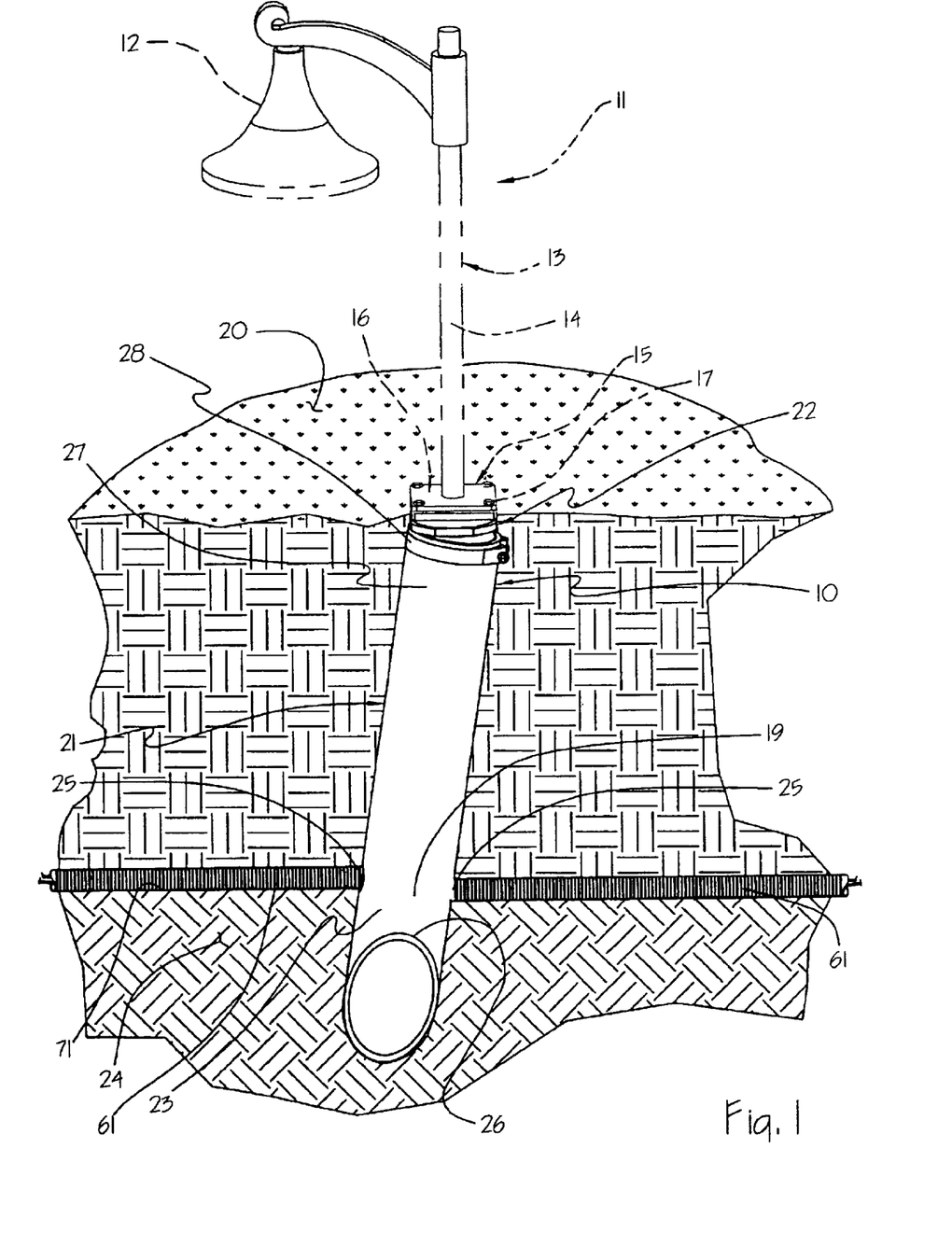
FIG. 1 is an elevational view of the mounting system of the present invention illustrating its relation to a landscaped area when installed.

In FIG. 1 there is shown mounted on the outdoor light system 10 of the invention, one of many outdoor light units 11 of a commercially available type. Such units 11, which are usually prewired, typically consist of a light fixture 12, mounted on a standard 13. The standard 13 includes a post or the like 14 extending upward from a base 15 shown as consisting of a plate 16 having holes for reception of bolts 17 which are used to secure the unit 11 to an inground support at, or slightly above, surface 20 of a landscaped area in which the unit 11 is installed.

The system 10 includes a pipe member 21 which receives an electrical adapter or connection box 22 in its open upper end. The pipe member 21 may be formed from commercially available PVC electrical conduit, such as a 4 inch or preferably 5 inch PVC pipe as shown, or of a bell end PVC pipe which allows for the connection box 22 being of a greater diameter. In some circumstances, it may be preferable to utilize a pipe member 21 formed of other materials, including, for example, ABS type plastic, or even certain available pipes formed of metal materials. The length of pipe cut to form the pipe member 21 preferably has a lower end 23 cut at an angle as shown at 26 to assist penetration into a lower layer 24 of unexcavated soil. Somewhat above the lower end 19 of the pipe member 21, there are provided a pair of opposed openings 25 a shown, or in some situations, as will be discussed below, a single hole or even three separate holes may be desirable. For reasons which will also be discussed below, the pipe member 21 may be prepared at different lengths, but from FIG. 1, it may be seen that in the final installation of the system, the pipe member 21 has an upper portion 27 extending to at least the approximate final grade shown as the surface 20 of the landscaped area containing the outdoor lighting. Encircling the upper portion 27 of the pipe member 21 is a compression type clamp 28, which, as will be described further below, holds the connection box 22 within the pipe member.

Figure 3:
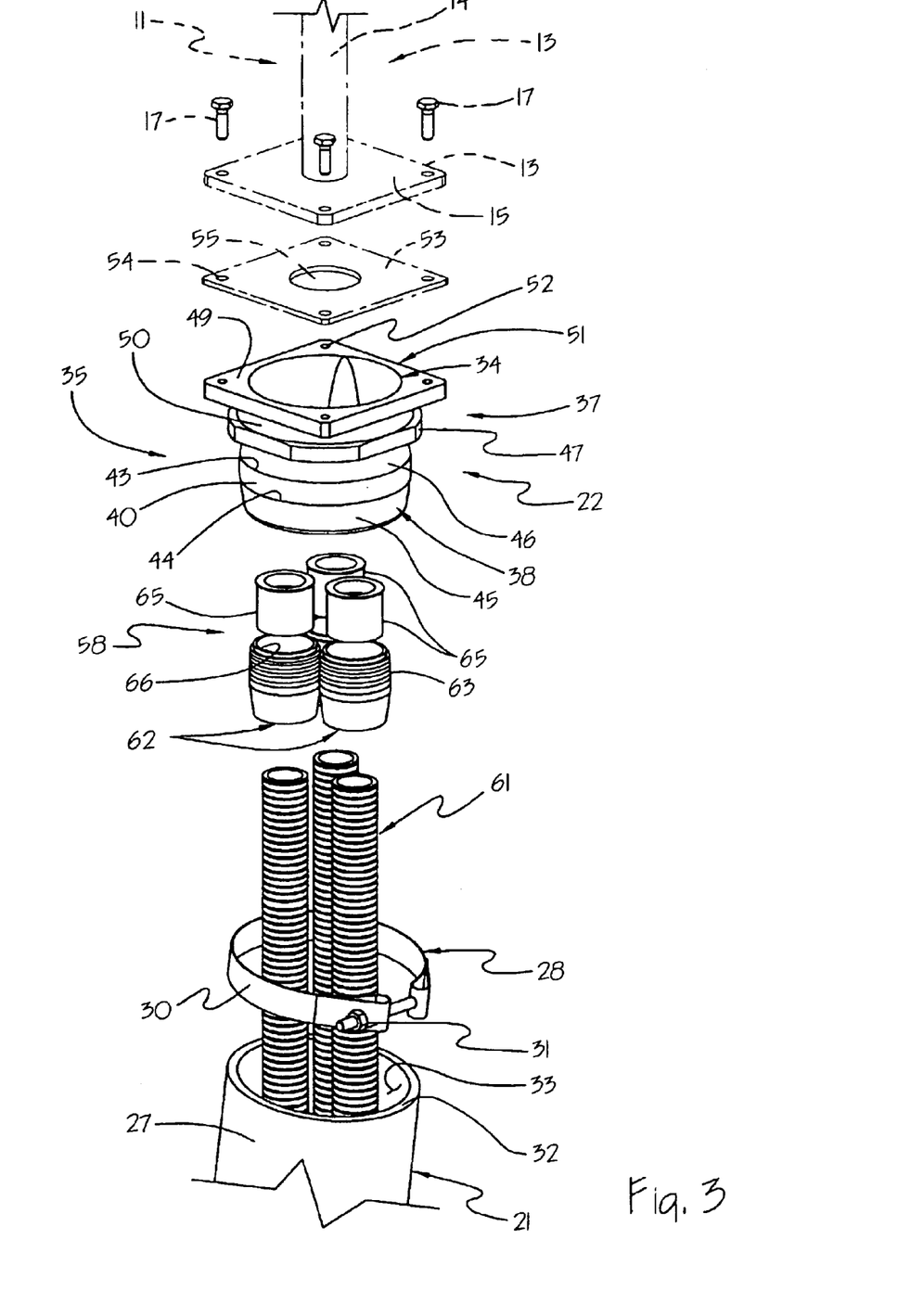
FIG. 3 is an exploded view of the components of the present invention as seen in the upper area of FIG. 2.

As described below in relation to a preferred method of installing the system of the invention, the connection box 22, which is cast, injection molded, or otherwise fabricated as an integral unit when provided for installation in the field, fits into the open upper end 27 of the pipe member 21 and is adjustable to a position wherein the light unit 11 can be readily mounted in an exact vertical orientation regardless of the fact the pipe 21 is mounted in only an approximate vertical orientation. Once the connection box 22 has been so positioned, the compression clamp 28 is tightened to prevent further relative movement between the connection box 22 and the pipe member 21. The clamp 28 may be a commercially available product and may be of the type consisting of a metal band 30, the ends of which are drawn together by tightening a bolt, such as a T bolt 31 (FIG. 3). When the pipe member 21 is made of the most preferable material, i.e., a PCV plastic, and most other plastics commonly used in forming pipes of a size useable in the invention, the wall 32 of the pipe providing an inner surface 33, which is engaged by the connection box 22, is of a mildly compressible nature. It will be appreciated that if other pipe of a more rigid nature, as identified above are used, it may be necessary to provide a number of short longitudinal slits or other form of cuts in the wall at the very upper end of the pipe member in order to provide such compressibility.

Figure 4:
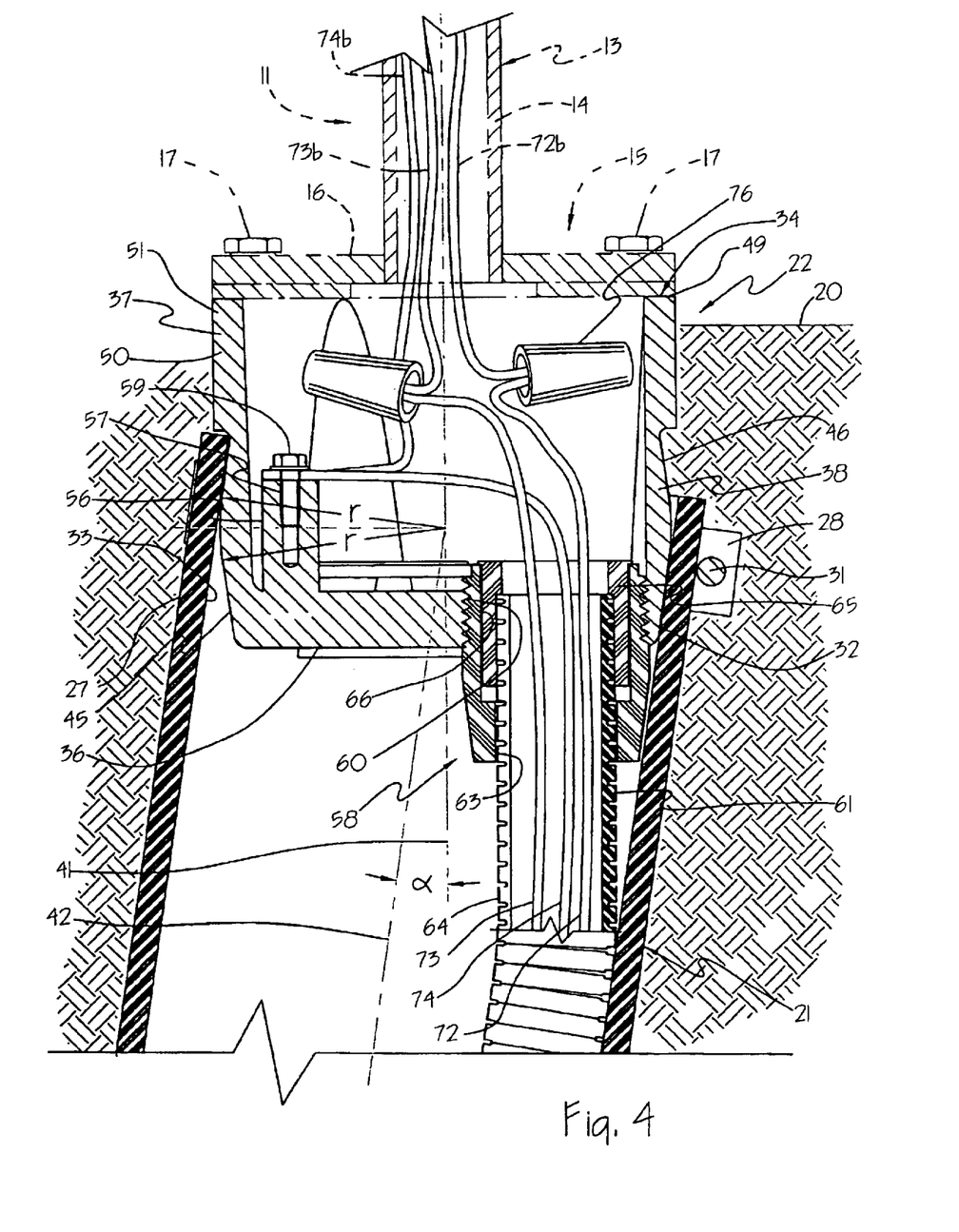
FIG. 4 is an even further enlarged cross sectional view of the upper portion of FIG. 2 showing a different wired connection than in FIG. 2.

The connection box 22, may be formed from two or more components which have been machined, cast or otherwise formed prior to fastening together to make the integral unit, but it would appear that the most economical method, particularly taking into account its designed configuration, is that of casting or otherwise molding the connector box 22 as an integral unit. Because of the loading and type of stresses the connection box experiences in use, it is believed that a more preferable material for the unit is metal, such as cast iron, ductile iron, powdered metal or aluminum, but for use under certain conditions of the outdoor exposure, other various materials, such as molded Nylon may be satisfactory. The shape of the connection box is generally of cup shape, having a flanged open top 34, a generally cylindrical side wall 35 and a relatively flat bottom wall 36 (FIG. 4). In describing the connection box, reference is made to an upper portion 37 which generally protrudes above the open upper end 27 of the pipe member 21 and a lower portion 38, which is generally contained, with some exception, within the inner surface 33 of the pipe member 21, as is most apparent in FIG. 4.

In order to permit a limited amount of universal movement, i.e., a ball-in-socket effect, of the lower portion 38 within the upper open end portion 27 of the pipe member 21, a portion of the outer circumferential surface of the lower portion 38 of the wall of the connection box 22 is in the form of a section of a spherical surface at 40 having its radius extending out from a longitudinal center line 41 of the connection box.

A radius r of the spherical surface is substantially equal to the inner radius of pipe member 21, i.e., the distance between a center line 42 of the pipe member 21 and the inner surface 33 of the wall 32, so that the outer surface portion of the connection box 22 formed by the spherical shaped portion 40 is in close contact with the inner wall surface 33. As best seen in FIGS. 3 and 4 the spherical shaped portion 40 is defined on the radius r between a lower limit and an upper limit shown by lines 43,44, respectively, in FIG. 3. Thus, as shown in cross-section in FIG. 4, the arcuate configuration is provided by the sphere. At each end of the arcuate configuration, as shown in cross section, the continuation from lines 43 and 44 represented lower land 45 and upper land 46. The lower land extends from line 43 to the lower end of the lower portion 38 of the connection box, while the upper land 46 follows a straight line upwardly. The straight lines may be at about 8°–10° each inward from a tangent line at the opposite ends of the arcuate configuration provided by the spherical surface 40. Accordingly, as illustrated, as the connection box is shifted to its maximum adjustment angle, shown as angle α in FIG. 4, in any direction, relative to the center line, i.e., central longitudinal axis of the pipe member, the engagement of the lower land 45 engages the inner surface 33 of the pipe member 21 at a short distance from the extreme upper end of the pipe member 21, while upper land 46 engages the inner surface 33 immediately adjacent the open end of the pipe member 21.

The upper end of land 46 forms the upper part of the lower portion 38 of the connection box 22 and terminates at a hexagonal or preferably octagonal flange portion 47 (FIG. 3), the outer points of which project slightly beyond the outmost diameter of the lower portion 38 so as to form a stop for the maximum insertion of the connection box 22 at which position the upper portion of the connection box is immediately above the upper end of the pipe member. Continuous with the octagonal hexagonal flange 47 is a short cylindrical section 50 the depth of which may vary depending on the room required for accommodating the desired type of wiring to be used in the installation, such as box capacity which may be required to meet existing wiring requirement and regulations. Immediately above the cylindrical section 50 there is integrally formed with the body of the connection box 22 a square upper flange portion 51 which has in each of its four corners threaded openings 52 adapted to receive bolts 17 on the final mounting of the outdoor light unit 11. In such mounting there is provided a compressible gasket member 53 having a peripheral shape matching the shape of the plate 16 forming the base 15 and/or the shape of the upper flange and further having bolt receiving openings aligned with the bolt openings of the base 15 of the tubular light unit and the threaded openings 52 of the upper flange portion 51. A central opening 55 is also provided in the gasket 53 to allow passage of the electrical wiring from interior of the post 14 of the outdoor light unit 11 to the interior of the connection box 22. Alternatively, it is possible to utilize an elastomeric 'O' ring, as a seal instead of the gasket 53 which is preferable where the box has a circular opening instead of that shown.

The inner horizontal surface of the bottom 36 of the connection box 22 has an upwardly projecting grounding post 56 with a threaded bore 57 extending downwardly thereinto for receiving a screw 59 (FIG. 4). The bottom 36 has at least one threaded opening 60 of a size to accommodate commercially available fittings, the opening preferably being 1¼ NPT. While a connection box having a single such opening would be sufficient for use when a single outdoor light unit is being installed an additional one or two openings are needed when a line must be run from one unit to a second unit 11 or two other units 11, respectively. Accordingly, it may be satisfactory to produce a single style of connection box 22 provided with three openings, as illustrated in another embodiment of the invention. In such a design, openings not used in a particular installation may be sealed with commercially available plugs or the like for the 1¼ NPT opening.

Figure 2:
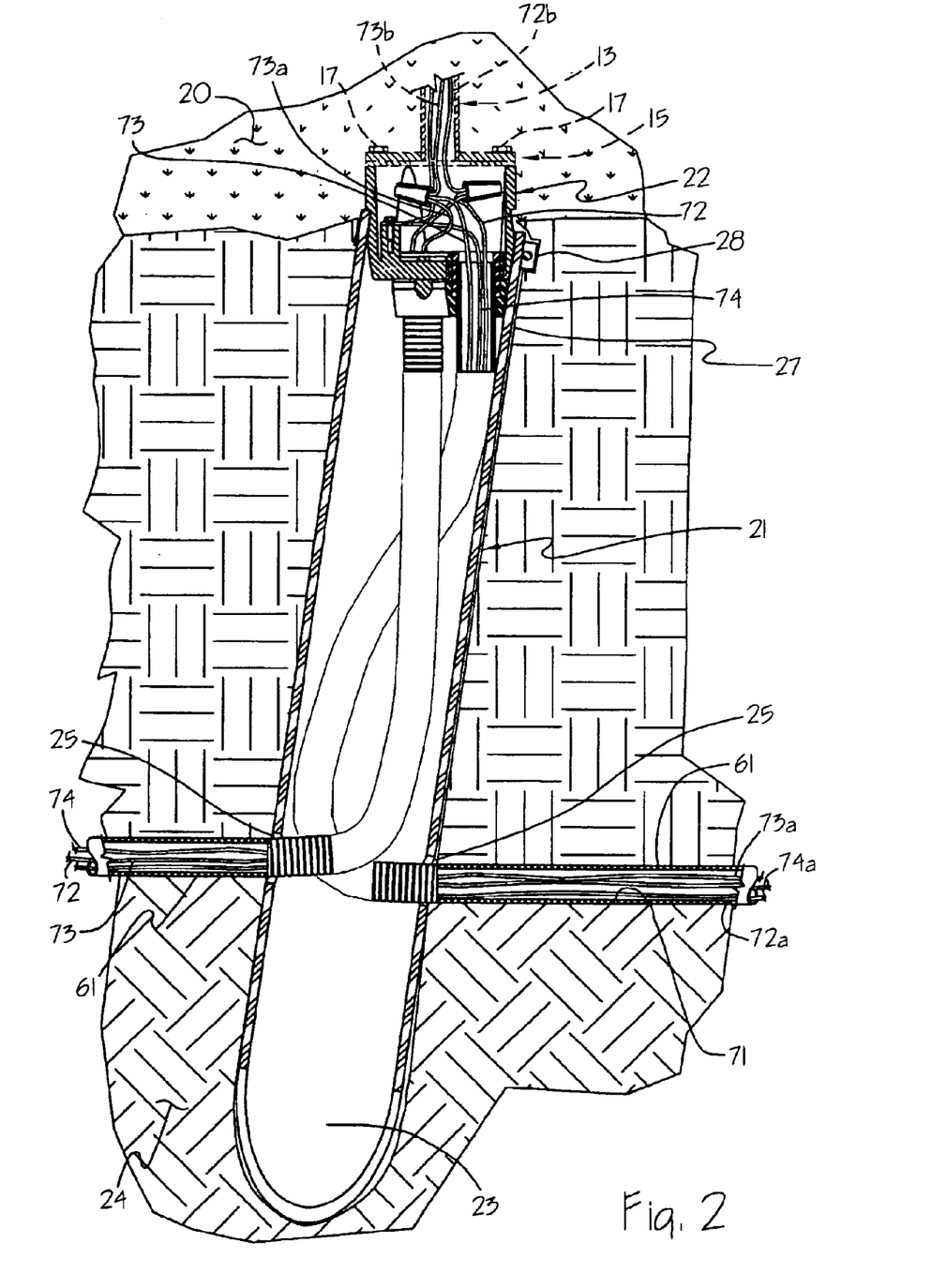
FIG. 2 is an enlarged vertical cross sectional view through the mounting system of FIG. 1 but on an enlarged scale.

While the embodiment illustrated in FIG. 2 shows the use of a connection box utilizing two of the openings 60, for sake of clarity, reference is made to the enlarge sectional view of FIG. 4 showing only one opening 60. As will be described further below the providing of underground wiring must meet certain set standards, which may differ in different geographical areas. Generally, however, it is possible to use buried wiring such as that known as NMWV cable, if protected, or a more expensive wiring known as Teck cable which includes its own shielding. There are available for use with such cables special fittings to utilize in the standard opening shown at 60 in FIG. 4. While it would be necessary in most cases to lay these types of cable when initially installing the pipe member 21 in the method of installation in this invention, there are also commercial components available to permit the drawing of the wires at other times, such as for repair and on occasion during final installation after landscaping. One approach is to utilize a conduit system which involves running rigid piping through which the wire can be drawn during or subsequent to the original roughing in procedure of installing the conduits, the pipe member 21 and possibly the connection box 22. While there are commercially available fittings for connecting such conduits to the connection box, the use of such rigid piping is generally awkward. A more easily handled type of conduit is commercially available in the form of a corrugated PCV tubing which can be purchased, for example, under the name of COR-LINE, a brand name of IPEK Pipe. This conduit is relatively flexible and easy to install in the system of the present invention, and it is shown as 61 in FIG. 3. For the use of this type of tubing there is shown in FIGS. 3 and 4 a special insert arrangement or fittings means 58 consisting of an outer basically cylindrical member 62 having an upper portion 63 which is shaped and threaded for reception in the opening 60. The cylindrical member 62 has a central opening therethrough with a lower portion 63 thereof being of a size to closely receive therewithin the outer surface 64 of the corrugated tubing 61. The fitting means 58 further includes an upper PVC member 65 for then being inserted from within the connection box 22, it also being a substantially cylindrical hollow member having a wall thickness for a slip fit between an inner surface 66 at the upper part of member 62 and the outer surface of the corrugated tubing 61, to accommodate solvent welding the parts of the fitting means 58 together.

Figure 5:
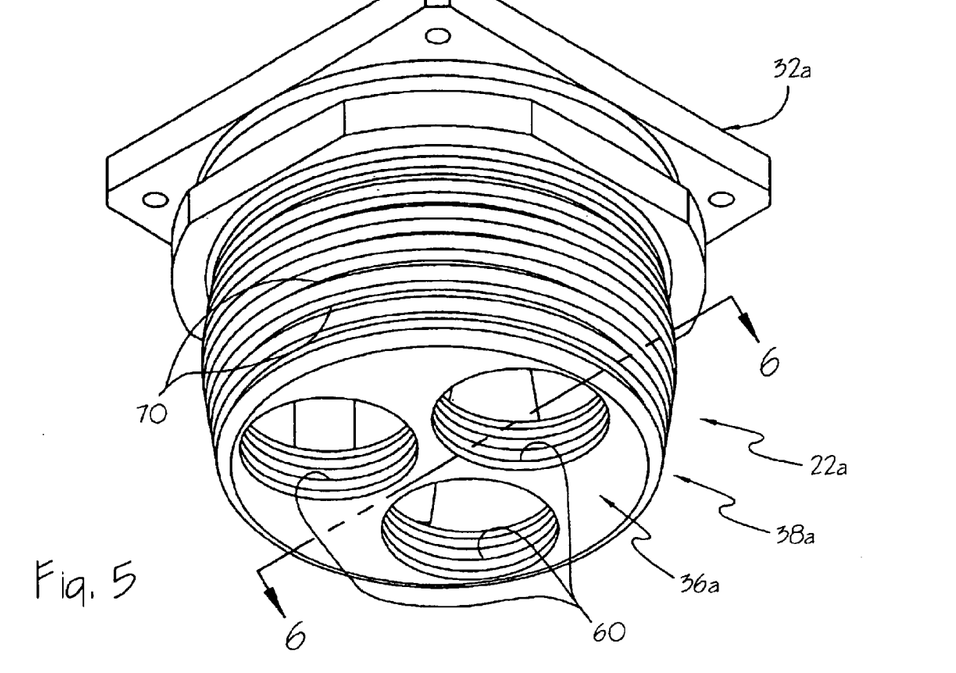
FIG. 5 is a perspective view of an alternative form of a connection box structure.
Figure 6:
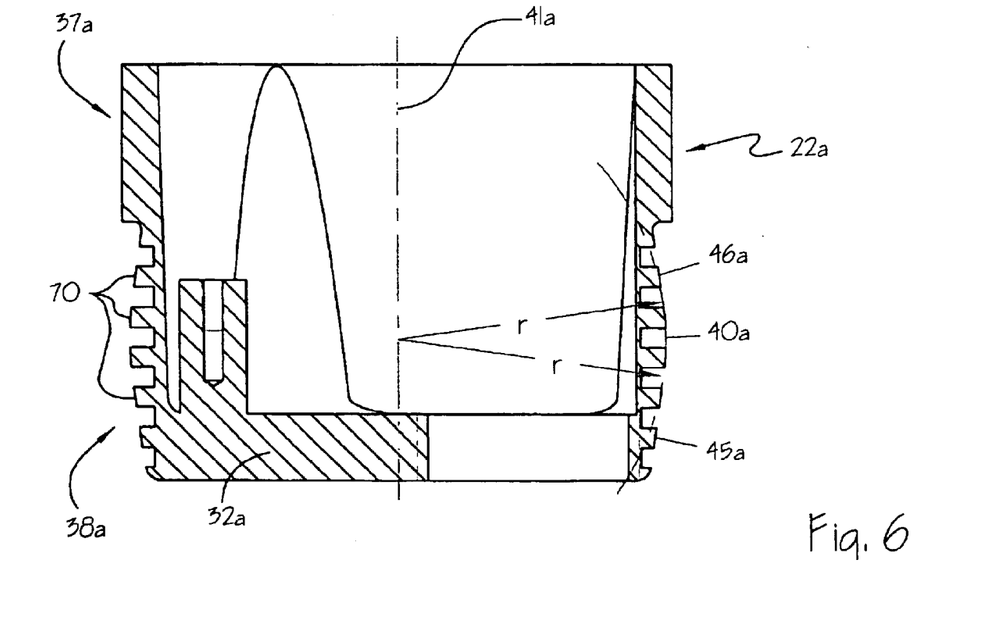
FIG. 6 is a cross sectional view of the connection box at FIG. 5 as seen from line 6—6 of FIG. 5.

In the embodiment shown in FIGS. 5 and 6, the general overall configuration of connection box 22a is the same as that of the embodiment illustrated particularly in FIGS. 2 to 4 but demonstrates an alternate outer shape that may suit other forms of higher production tooling and/or weight savings.

The upper portion 37a of the connection box 22a may be identical to that of the previously described embodiment. In the lower portion 38a, the bottom 32 is also the same as that in the previously described connection box 22, and in FIG. 5 there is readily shown the three equally spaced additional openings to which reference was previously made. However, while the effective profile of the portion forming the spherical section 40a and the adjacent lower and upper lands 45a and 46a, respectively, is the same, it may be seen that instead of a smoother outer surface, the lower portion 38a of the connection box 22a is different in that it consists of a plurality of spaced circumferential ribs 70. Because of the sameness of the profile of the section of the sphere presented by the outer edges of adjacent ribs 70, the interaction between the outer surface of the lower section 38a and the inside of the upper end of a pipe member (not shown) into which the connection box inserted; is the same in its provision of universal movement between connection box and the pipe member. Also the existence of the adjacent lower and upper lands, 45a and 46a again presented by the outer edges of the ribs 10 has the same effect in profile for like areas in the previous embodiment, i.e., they limit the deviation of the central axis 41a of the connection box 22a to the central axis (not shown) of the containing pipe member in the same manner.

A purpose of forming the outer surface with the plurality of raised ribs instead of the structure shown for box 22 is to provide better casting and molding features by providing a more even cooling procedure which may prevent cracking. Additionally, depending on the materials used in the pipe member 21 it is capable of providing a more effective clamping between the pipe member 21 and the connection box on tightening of the compression clamp 28.

The method of installing the system according to the invention overcomes the disadvantage indicated above in relation to known procedures. Prior to completing the landscaping of the site in which the outdoor lighting units are to be installed, the lower layer 24 of soil which in the main has been unexcavated is first trenched to a depth indicated at 71 in FIGS. 1 and 2 so as to allow laying of the conduits, which may be of the corrugated tubing 61 from the source and to each of the areas to include a outdoor lightening unit 11. At each such area there is installed one of the pipe members 21 which may be driven into the ground in a generally vertical direction below the level of the trench bottom 71. The selection of the length of the pipe member 21 is such that the upper end thereof extends upwardly to a height in excess to the expected landscape surface 20. If necessary, concrete may be poured in a small patch around the lower end of the pipe member or as a column around the pipe so as to help secure its position. The corrugated tubing 61 in which the wiring shown as 72, 73 and 74 has been pulled through is then laid in the trenches and cut so that an end terminating at the pipe member 21 can be inserted through one of the holes 25 and pulled to the top of the pipe members. If an adjacent one or two light units are to be included in the same circuit, a beginning of an extra length or two of corrugated tubing is also fed through an opening 25 and pulled to the top of the same pipe member 21 and that tubing is then laid in trenches extending to the area for the next one or two light units. At this stage the laid tubing is partially covered, and even the connection box may be temporarily installed, but this functions may be deferred until final installation is being carried out.

In the method of the invention, final installation is preferably delayed until the landscaping is finalized at least to the establishing the final grade at surface 20 indicated in FIGS. 1, 2 and 4. At this stage the excess in length of already installed pipe member 21 can be cut off at the landscaped surface 20. At this time the connection box 22 is readied for final installation by reading the cylindrical member 62 which is part of the fitting 50 into one of the threaded openings 60 in the bottom of the connection box. The already present corrugated tubing with the wires 72, 73 and 74, protruding from the end thereof, is pulled through into the central opening in the member 62 and the upper member 68 of the fitting 58 is inserted from inside the box 22, and the fitting parts connected by the solvent welding. At this time the wires 72, 73 and 74 extend from the end of the corrugated tubing within the box 22 and a plug and/or sealant are applied to the insides of the fitting 58 so as to prevent any exterior leakage into the box connection. The wires 72 and 73 forming the hot and neutral wires are connected to the wires 72b and 73b of the light unit and secured by twist on connector 76. Ground wire 74 is wrapped around screw 59 which is then tightened to provide a tail of ground wire 75 which is affixed to a provided ground wire 74b of the light unit via a twist connector not shown. The light unit 11 may then be secured to the connection box 22 with the under surface of plate 16 being carried on upper mounting surface 49 of the flange portion 51 once gasket 53 or an 'O' ring has been located therebetween. The base 13 of the standard 73 is affixed to the upper flange portion 51 via bolts 17.

While the pipe member 21 was in fact only originally mounted in a general vertical position, and in fact may have been somewhat displaced subsequent to its earlier installation, the final affixing of the connection box 22 within the upper end of the pipe member can be readily accomplished with the upper exposed member surface 49 of the upper flange portion precisely disposed in a horizontal plane. Before permanently tightening compression clamp 28, the angle between the center line 41 of the connection box 22 and the center line 42 of the pipe member is adjusted to ensure that the standard 13 of the light unit 11 is vertical as finally installed. This may be done before actually connecting the light unit 11 to the connection box 22 by utilizing a level on the upper surface 49 of the box 22 to ensure it is in a horizontal plane. Alternatively, the clamp 28 may be left relatively untightened until the light unit is attached, the post 14 is moved to its exact vertical orientation before the final tightening of the clamp 28.

Another advantageous feature of the manner in which the connection box is affixed to the pipe member 21 is that the amount of compression of the upper end of the pipe 22 against the spherical profile of the outer surface of the connection box can be such as to hold the light unit in its set position under all normal conditions, while permitting the light unit 11 to be deflected from the set position when hit with a force which would otherwise damage the light unit.

While the wiring description given in relation to the mounting of a light unit as illustrated in FIG. 4 has been given, it should be noted that in FIG. 2, there is illustrated a difference in the wire connections within the connection box 22. In the arrangement shown here there are connected to wires 72 and 73, as well as wires 72b and 73b of the light unit 11, wires 72a and 73a which pass through a corrugated pipe 61 connected to the box through a second opening in the connection box. As previously mentioned, these wires extend to a subsequent light unit in a series. Yet a third light unit might be separately fed through a third set of wires which would pass out through the third opening 60 in the bottom of the connection box 22.

As indicated, an important feature of the above embodiment of the invention is the manner in which the connection box is adjustable for enabling the correct vertical installation of the light unit. This is accomplished in the illustrated embodiment by the adjustment of the angle of the complete connection box relative to the pipe member to establish the upper standard supporting surface 49 of the connection box in a horizontal plane. It will be obvious to those skilled in the art that the establishing of the supporting surface in the desired plane can also be accomplished by providing a universal connection within the box construction per se so as to accomplish a lockable universal movement as that described above between the upper and lower portions of the box connection. Such an arrangement might be more practical in a smaller type box which would be used, for example, in certain installations which use a lower voltage, such as 12 volts.

Figure 7:
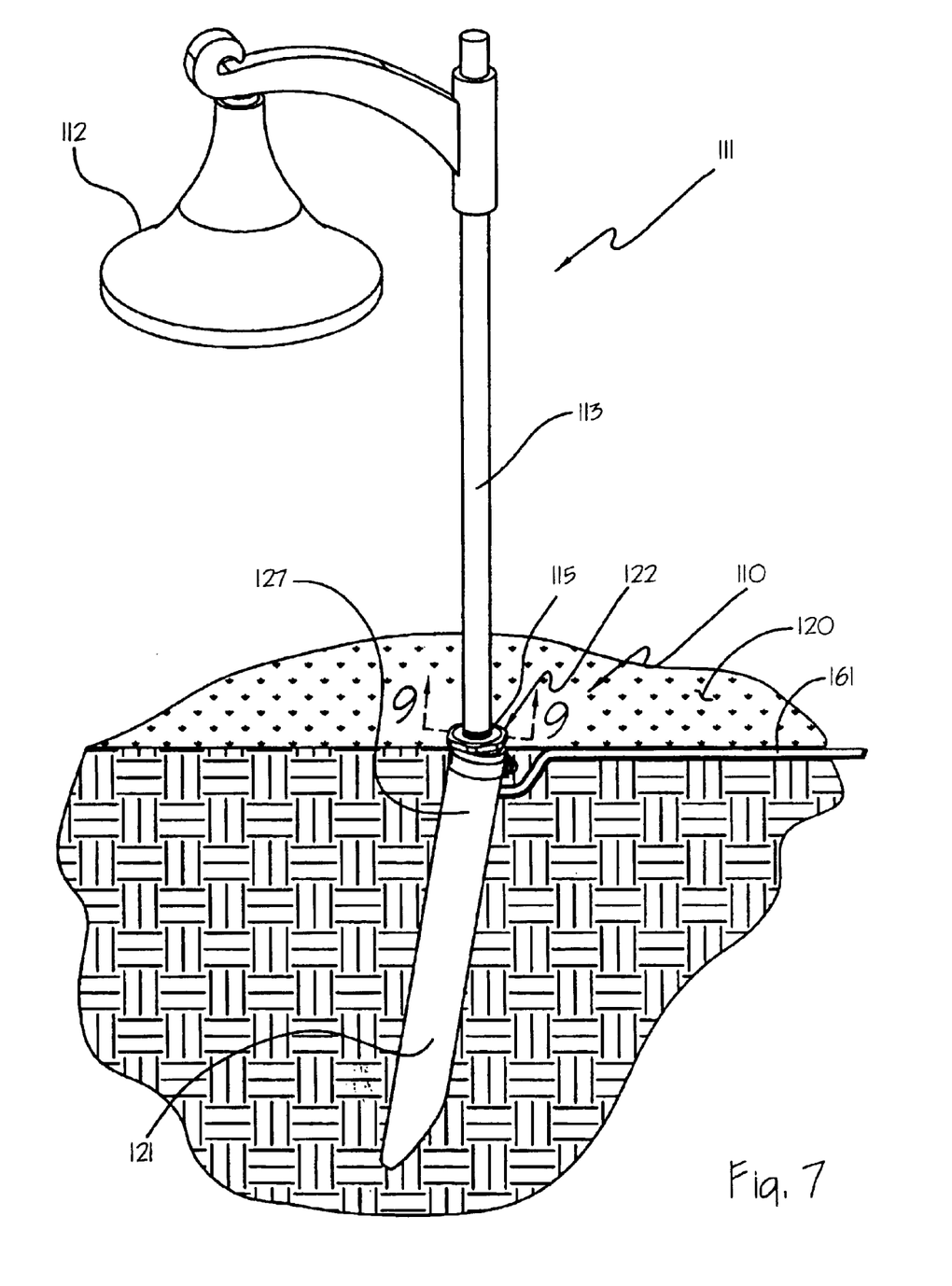
FIG. 7 is an elevational view of an outdoor light as installed and incorporating another aspect of the invention incorporating an adapter.

Referring now to FIG. 7, there is shown at 122 a simpler form of an adapter of the invention for incorporating in an outdoor light system 110. On adapter 122 there is shown mounted an outdoor light unit 111 usually of a commercially available type of relatively economical design. The light unit 111, as shown, consists of an illuminating or lighting fixture 112, preferably designed to operate on a 12V electrical supply, affixed to a standard 113 in the form of a pipe provided at its lower end with pipe threads 115, such as ½ NPT (STD). In order to make the provision for mounting the standard versatile so as to accept different sizes of standards 113, other means such as the inclusion of a set screw, shown at 180 in FIGS. 8 & 9, could be provided for threading into a tapped bore 181 through the wall of the adapter 122. As will be described in more detail below, in relation to the embodiment illustrated, the lower end of the standard 113 is threaded into the adapter 122 which in turn is received in the upper open end 127 of a pipe member 121. In the event the lower end of the standard 113 has a female NPT thread at its lower end, as may be the case for some commercially available light units, a NPT nipple may be utilized to connect the light unit to the adapter as described below.

The pipe member 121 may be formed by a length of commercially available PCV electrical conduit, but in some applications, it may be acceptable to utilize a pipe member 121 formed of other materials, including, for example, ABS type plastic, and with such material, it has been found desirable to provide a notch (not shown) in the upper end of the pipe member so as to enhance its radial compressibility and thus reduce the amount of pressure required by the clamp. It is possible to use pipes of other materials, or even certain available pipes formed of metal materials, such as galvanized steel, in which case, it may be necessary to provide certain forms of cuts, or the like, at the very upper end of the pipe member in order to allow at least some compressibility of the pipe member when installing the adapter 122 of the invention. Moreover, it should be noted that while for the sake of economy reference is made to a pipe member, such member need not be tubular throughout its length, provided the upper portion thereof is pipe-like formed of a circular wall which is at least mildly compressible. As will become apparent from below the element termed a pipe member in any event forms an elongated foundation member for the outdoor light unit 111.

The pipe member 121 which is embedded in the ground for supporting the light unit 111 has its open upper end 127 extending to approximately ground level 120 or just shortly thereabove. In the embodiment of FIG. 7, which is adopted for low voltage use, such as 12 volt, there is provided an opening 125 (FIG. 8) in the upper end 127 of which is disposed near, but preferably for location slightly below, ground level 120. As indicated, the pipe member 121 may be of commercially available PCV electrical conduit, such as 1¼" PCV, or preferably 1½" PVC or larger under some conditions. During installation of the pipe, in certain conditions, it can be driven into the ground, but preferably, the hole of the approximate size can be made by driving a metal element, such as a steel bar, of the approximate size of the pipe member 121 into the ground to receive the PCV pipe with less effort. Alternatively, a custom drill may be provided which would allow a home owner to pre-drill a hole of the appropriate size for the selected diameter of the PCV pipe.

The adapter 122 of the present invention is preferably in the form of an integral body and may be fabricated of various material, such as aluminum alloy bar stock. As shown more clearly in FIGS. 8 and 9, the body of an adapter 122 generally consists of an upper portion 137, which in the illustrated embodiment, is a multi-faced flange 139, and a lower portion 138 shaped more in a cylindrical fashion, but wherein the outer circumferential surface thereof has at least the profile of a section 140 of a sphere. This outer profile surface has its radius extending out from a longitudinal center line 141 of the integral body (FIG. 9). The radius r is substantially equal to ½ of the inner diameter of the PCV pipe so that as the lower portion 138 of the adapter is inserted in a close fitting condition into the open upper end 127 of the pipe member 121, it can be tilted in any direction relative to a central axis 142 of the pipe member 121. The upper portion 137 of the adapter 122 which forms the flange 139 extends radially outward a distance greater than the surface provided by the section 140 of the sphere so that on insertion of the lower portion 138 of the adapter 122 into the upper end 127 of the pipe member 121, the flanges 139 engages the end of the pipe member to thereby limit the entry of the adapter 122 into the pipe member 121. It may be seen that the outer profile of the flange 139 is shown as having a plurality of flat sides, such as an hexagonal. It is preferable to provide such flat sides, or at least two such flats, one on each side, such as by milling opposite sides of a round bar stock if such is used to form the adapter. The purpose of such flats are for accommodating a wrench to hold the adapter from rotation when connecting the light standard 113.

Accordingly, only the lower portion 138 cooperates with the inner surface of the pipe member 121 to allow a limited amount of relative universal movement, i.e., a ball and socket effect. As indicated above and shown in cross-section in FIGS. 8 and 9, an arcuate configuration in cross section is provided at section 140 of the sphere. Lands 145 and 146 are located at each end of the arcuate configuration, as seen in cross section, the ends being designated by circumferential lines 143 and 144 (FIG. 2). The area above line 143 is shown as upper land 145 and the area shown below line 144 is shown as lower land 146. The upper land 145 follows a straight line from line 143 to the lower side of the flange 139, and lower land 146 follows a straight line from line 144 to substantially the lower end of the adapter. In longitudinal cross section these lands 145 and 146 provide straight lines as opposed to the curved line provided by the curved surface of the section 140. The straight lines of the lands 145 and 146 actually extend from the termination of the arcuate curvature of section 140 at small inward angles relative to the tangent at the edges 143 and 144 of the arcuate curvature. The lands provide the limit of tilt of the axis 141 of the adapter 122 relative to the axis 142 of the pipe member 121 to an angle α as such lands engage the inner surface of the pipe member 121 on opposite sides thereof as shown in FIG. 3.

In the illustrated embodiment of the invention utilizing the adapter 122, a central concentric common passageway 159 extends through both the upper and lower portions 137 and 138 of the adapter 122. The upper end of the passage is provided with female threads 159a for region of threaded lower end 115 of the light standard 113.

In the embodiment of the invention shown in FIGS. 7–9, an electrical cable 161 suitable for 12V electrical transmission may be laid on top of the ground or slightly below at the surface 120. The cable 161 enters the upper end 127 of the pipe member 121, which may be slightly below the ground level through opening 125 (FIG. 9). Alternatively, in this embodiment of the invention, when a low voltage is used, the connection of the wires supplying electricity, such as in the cable 161 can be made to the wires extending down the light standard 113 outside of the pipe member or adapter 122 in the case of the use of a smaller pipe member 121. However, in the illustrated embodiment, the wires 172a and 174a, which run down through the light standard 113 from the light fixture 112, extend through the passage central passage 149 of the adapter 122, are connected to wires 172 and 174 of the cable 161 by the usual twist or connectors 176 within the pipe member 121. Final adjustment of the light standard, say to a perfectly vertical position, can be achieved by the universal type shifting of the adapter 122 by way of the swivelling of the lower portion 138 of the adapter 122 within the upper end 127 of the pipe member 121 prior to final tightening of the compression clamp 128 about the pipe member 121 at the location of the section 140 of the sphere of the adapter. The clamp 128 may be of the type shown in the drawings or of a heavier type, such as that known as a T-bolt clamp. The appropriate tightening of the clamp 128 prevents further relative movement between the adapter, into which the standard 113 is threaded and the upper end 127 of the pipe member 121 which is held securely within the ground.

As previously described the section 140 may be the shape of the actual outer surface of a sphere of the size described, but the surface may be circumferentially and/or longitudinally grooved, but still defining in total an outer profile of the sphere as described in relation to the earlier embodiment of the invention. One purpose of providing any such grooving, which would occupy a minor portion of the overall area of the section 140, would be to provide a more positive gripping of the adapter 122 within the pipe member 121 when a constricting force is applied to the wall of the pipe member 121 about the section 140 by a compression clamp 128.

Figure 10:
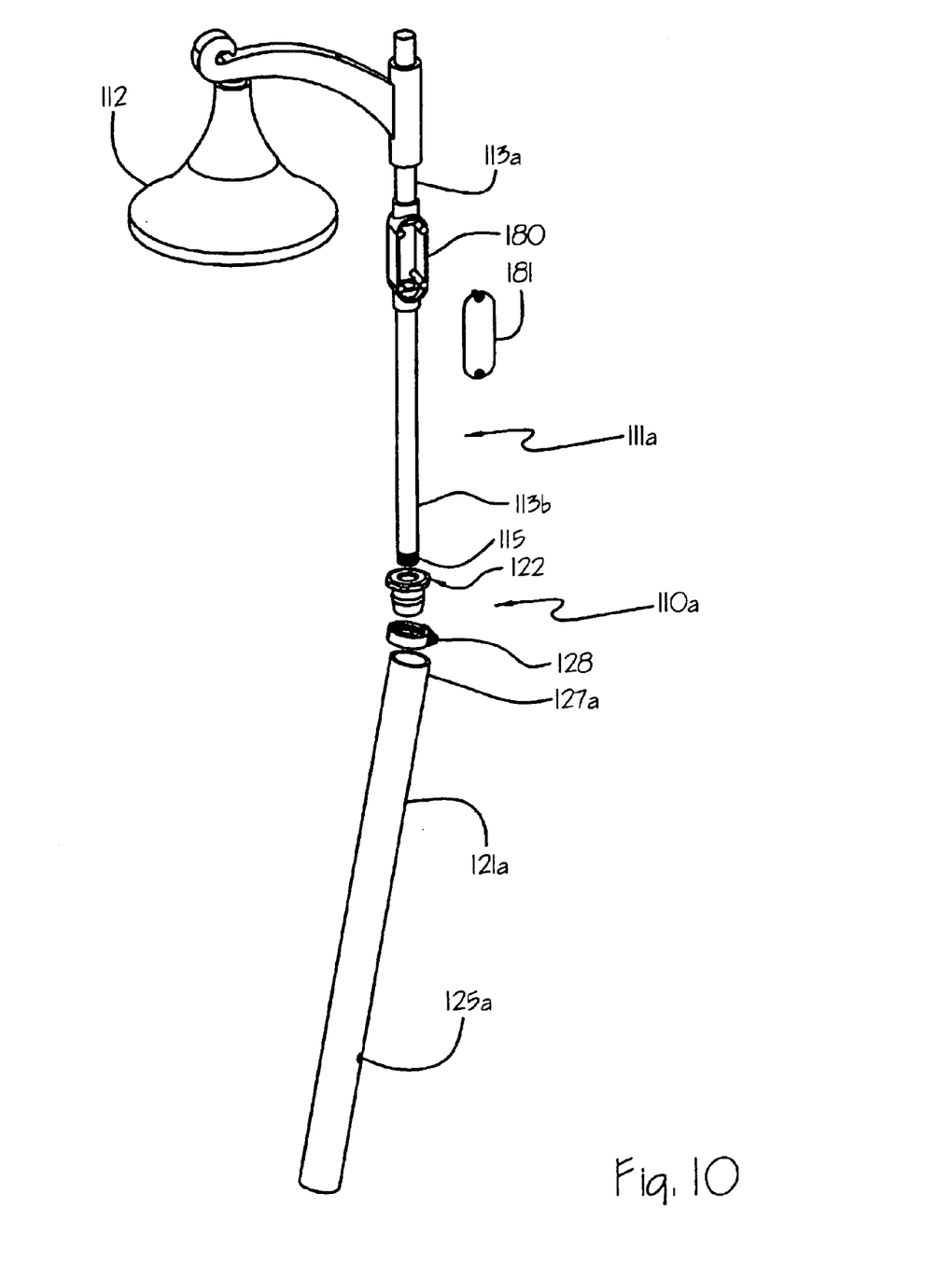
FIG. 10 is an exploded elevational view of an outdoor light fixture incorporating the adapter of the invention in a different form of an installation.

In the arrangement shown in FIG. 10, provisions are made for the installation of an outdoor light system 110a in which the electrical cable or wires contained within a corrugated PCV tubing must be laid in a trench rather than on or slightly below the ground surface. As may be seen the pipe member 121a is provided with an opening 125a which is closer to its lower end rather than at its upper end as in the case of the installation arrangement shown in the previous embodiment. The underground cable (not shown) which is laid in the trench is threaded tough to opening 125a in the pipe member and is pulled up through the pipe member. As the adapter 122 and the light standard, which consists of a lower pipe section 113b and an upper pipe section 113a connected by a junction box 180 having a removable cover 181, are assembled with the pipe member 121a, the cable or wires which enter the pipe member through opening 125a are pulled up through pipe section 113b to the connecter box 181 where they are connected to the wires extending from the light fixture 112 through pipe section 113a. Once connected, a cover 181 is affixed to the box 180, at which time, or even before the final wire connections are made, the light standard can be adjusted to its proper orientation, such as to the vertical, and the clamp 128 tightened to fix the position of the outdoor light unit 111a relative to the pipe member 121a which is secured within the ground.

Figure 8:
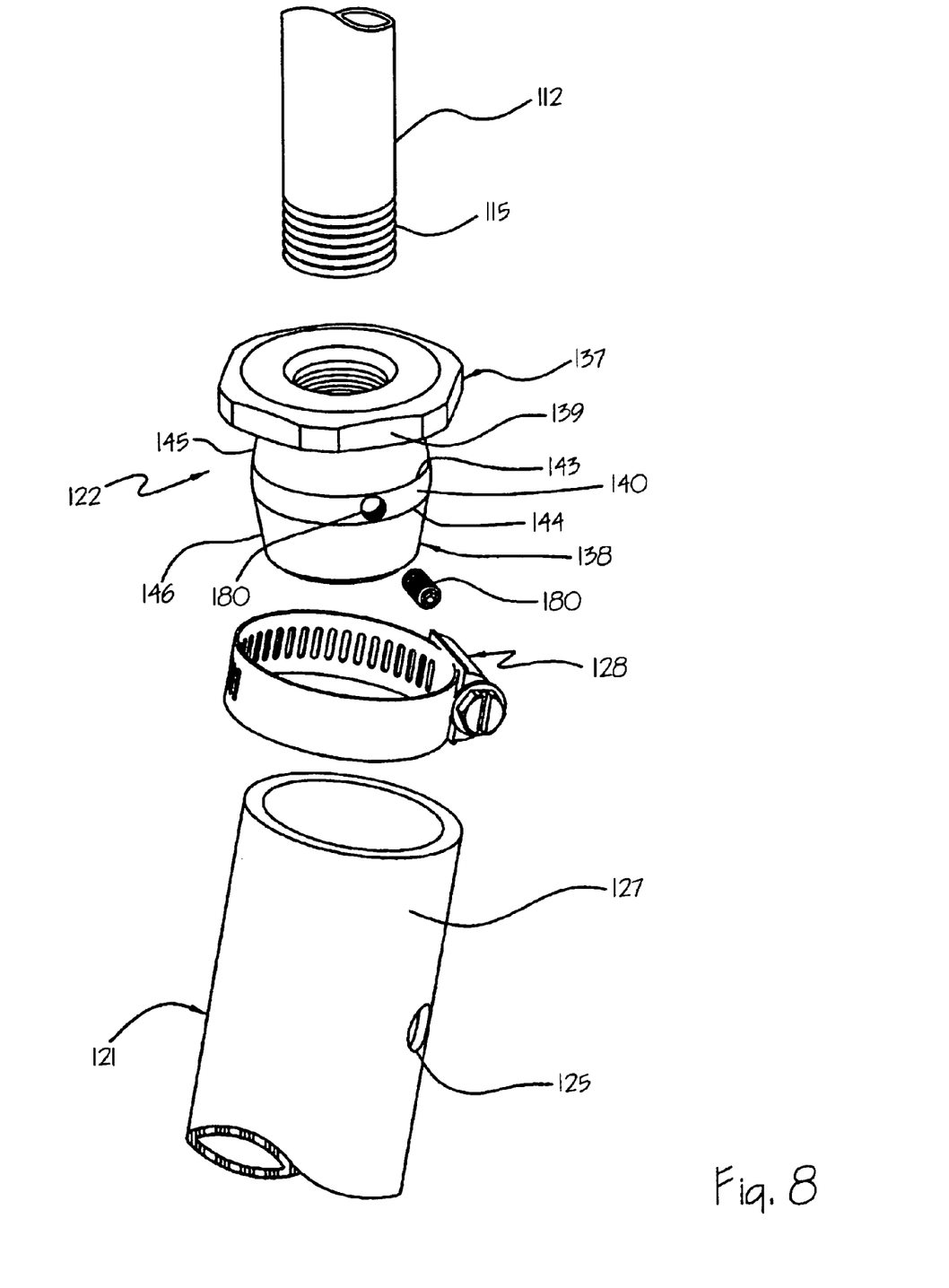
FIG. 8 is an enlarged exploded view of a portion of the installation of FIG. 7 showing a perspective view of an adapter of the invention.
Figure 9:
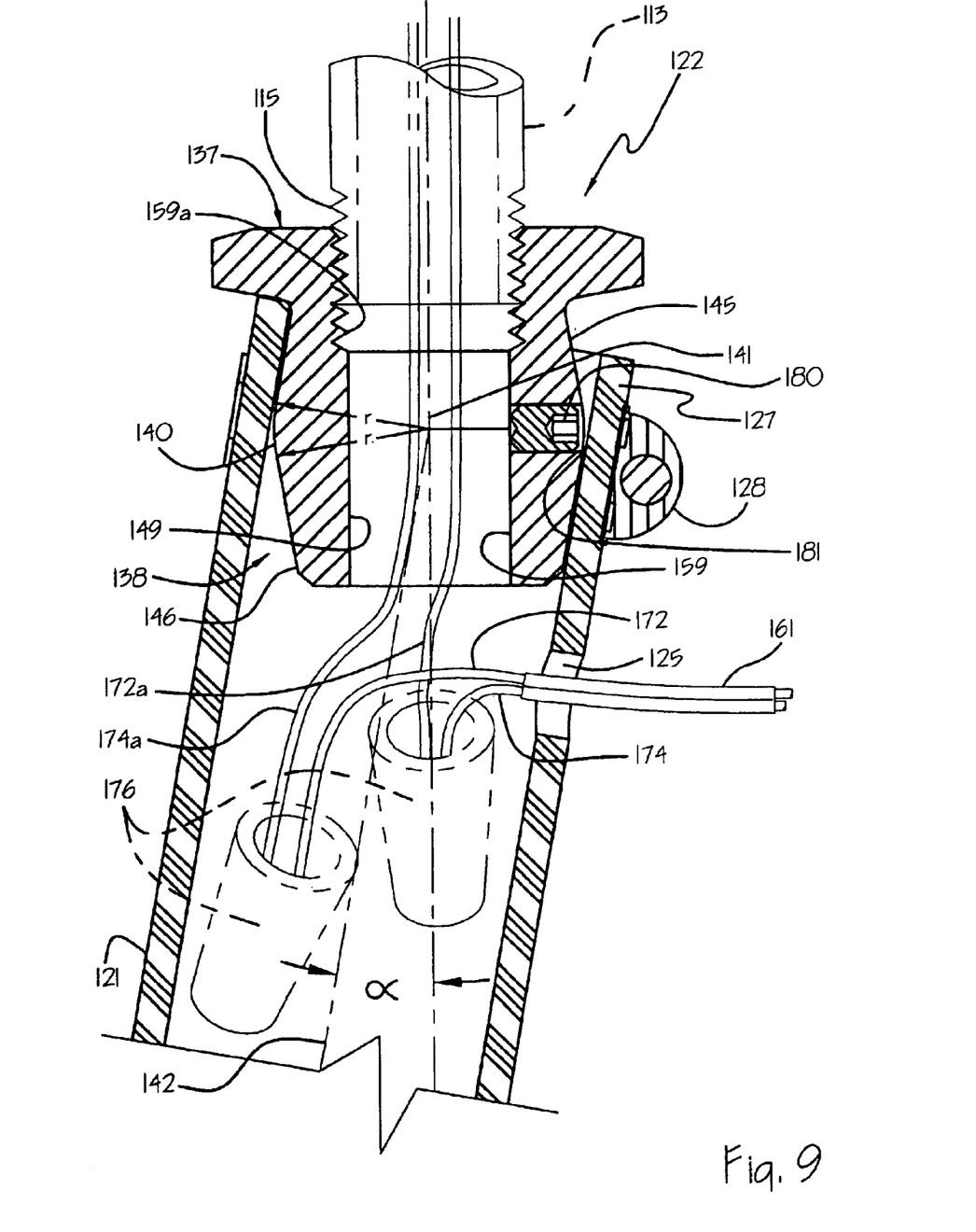
FIG. 9 is an enlarged cross sectional through the adapter, as seen from the line 9—9 of FIG. 7, and in an installed position within the pipe.

It may be seen from the above, and particularly in relation to the embodiment of FIGS. 7–9, the invention provides for a relatively simple installment of an outdoor lighting system readily available to a home owner and which may be made at anytime to enhance the lighting and the landscaped appearance in the area of the home. As indicated in relation to the foundation member, particularly one in the form of a length of pipe such as a commercially available PCV pipe, it is economical to use because it is commercially available, as are the compression clamps 128. The adapter 122 of the invention could be provided in different sizes, such as options of the section 140 of the sphere being of 1¼", 1½" or 2" radius to closely fit within the above mentioned size of PCV electrical conduit. The adapters could in fact be sold in kits matched with the lengths of pipes and/or clamps or separately leaving to the user the acquirement of the pipe and clamps of the appropriate size for use with the related adapter of the invention, as would the selection of the outdoor light unit 111. It may also be advisable to make available separate form the above pieces a rigid bar or a custom drill for setting the pipe member into the ground.

It can be further appreciated that the clamping of the lower portion of the adapter 122 within the pipe member 121 can be of selected tightness so that under the condition of a harsh force against the light unit 111 of a magnitude that would otherwise damage the unit, movement between the adapter and the inside of the wall of the pipe would allow some deflection of the light unit which could be later reset.

It will be appreciated that while preferred embodiments have been described, variations within the spirit of the invention as defined in the appending claims will be obvious to those skilled in the art.

What is claimed is:

1. An adapter for use in an upper end of a supporting pipe means embedded within the ground and supporting a standard of an outdoor light fixture above ground surface, the pipe means having a central longitudinal axis and an open upper end defined by an inner surface of a mildly compressible circular wall, said adapter comprising;

an integral body having an upper portion and a lower portion both disposed about a vertical central axis, said lower portion providing an outer surface defined at least in part by a section of a profile of a sphere having its center on the central axis of said body and a radius substantially equal to a radius of said inner surface of the open upper end of the pipe means, said upper portion providing a mounting surface accessibly from above said ground surface for cooperative engagement with said standard of a light fixture for attachment of said standard to said adapter, whereby on applying a clamping force about the upper end of the pipe means subsequent to inserting of said lower portion of said adapter into upper end of said pipe means and adjusting said central axis of said body of said adapter relative to said central longitudinal axis of the pipe means, said central axis of said adapter is held in a fixed position relative to the vertical.

2. An adapter as defined in claim 1, wherein;

said adapter has a central opening extending therethrough for the passage of electrical wires from the interior of the pipe means and into the standard of said light fixture.

3. An adapter as defined in claim 2, wherein;

said upper portion of said adapter includes a flange means with at least portions thereof extending radially outward from the central axis of the body an extent greater than said outer surface defined by said section of a profile of a sphere of the said lower portion.

4. An adapter as defined in claim 3, wherein;

said central opening within said upper portion is circular in cross-section and includes internal threads for mating with a threaded lower portion of a standard of said light fixture.

5. An adapter as defined in claim 3, wherein said flange has wrench engaging flat sides about its periphery.

6. An outdoor lighting support system for a light unit including a standard supporting an illuminating fixture, the standard having connecting means at a lower end thereof, said support system comprising an elongated foundation member for lengthwise insertion into the ground and providing an open upper end defined by an inner surface of a mildly compressible circular wall, an adapter including an integral body having an upper portion and a lower portion both disposed about a central axis, said lower portion providing an outermost outer surface defined at least in part by a section of a profile of a sphere having its center on said central axis of said integral body and of a radius substantially equal to a radius of said circular wall of said foundation member for close reception in said open upper end thereof to thereby permit a ball and socket action between said lower portion of said adapter and said circular wall of said foundation member, said upper portion defining a flange projecting radially outwardly from said central axis of said integral body a distance greater than said radius of said section of a sphere;

said upper portion further providing connecting means for rigid attachment to the connector means at the standard of the light unit, and clamp means for constricting engagement about said circular wall of said foundation member for selectively inhibiting said ball and socket action.

7. A mounting system for an outdoor light standard of the type including a post affixed to and extending upwardly from a bottom horizontal base portion, said system comprising:

an elongated pipe member for installing below ground surface in a position having a longitudinal axis disposed in an approximate vertical orientation;

said pipe member having at least one subsurface opening for receiving electrical wires and an open upper end being defined by an inner surface of a mildly compressible, circumferential wall of said pipe member;

a box unit for electrical connection having a lower portion for reception in said open upper end of said pipe member and an upper portion disposed above the upper end of said pipe member, said lower portion of said box unit having an exterior circumferential surface for close engagement within said inner surface of said wall of said pipe member, said upper portion of said box unit having an exposed upper surface providing a horizontal face for supporting said base portion of said light standard, and, universal connection means providing for adjustment of a vertical axis of said upper portion of said box unit relative to said longitudinal axis of said pipe member; and locking means for holding said upper portion of said box unit relative to an adjusted position relative to said longitudinal axis of said pipe member, whereby said vertical axis of said upper portion of said box unit is locked after adjustment in a fixed position relative to said longitudinal axis of said pipe member for holding said upper surface of said upper portion of said box unit in a horizontal plane regardless of said pipe member having been installed with the longitudinal axis thereof with a deviation from the vertical.

8. An electrical connection box for use in a mounting system for an outdoor light standard of the type including a post secured to and extending upwardly from a bottom flange, said mounting system including a rigid pipe member for installation within the ground, the pipe member having a longitudinal central axis and an open upper end defined by an inner of a mildly compressible circular wall of the pipe member, and clamp means for encircling and compressing the circular wall, said connection box comprising;

an integral unit formed of a lower hollow portion and an upper portion terminating in an upper flange defining a flat surface in a plane normal to a central longitudinal vertical axis of said connection box for supporting and attachment to said bottom flange of said light standard, said lower portion of said connection box including an outer wall providing an outer surface profile defined at least in part by a section of a sphere having a center on said vertical axis of said connection box and a radius substantially equal to that of the inner surface of the circular wall of the pipe member, whereby upon reception of said lower portion of said connection box in the open end of the pipe member, said lower portion can be oriented to a set position with said longitudinal axis of said box at an angle relative to the longitudinal axis of the pipe member resulting in said flat surface of said upper flange being horizontally disposed prior to tightening said clamp means so as to compress said wall of said upper end of said pipe member about said outer surface of said lower portion of said box thereby resisting movement of said connection box from said set position.

9. In a method of preparing a mounting system for supporting an outdoor light standard of the type having a base defining a horizontal bottom face, the steps of:

affixing at least a lower end of an elongated pipe member within the ground base with a axis of said pipe member in a generally vertical orientation, said pipe member having at least one opening in a lower part thereof for receiving electrical wiring;

inserting a lower portion of an electrical connection box into an open upper end of said pipe member in a close fitting agreement, said box having an upper portion defining a flat surface normal to a central axis of said upper portion for supporting said bottom face of said light standard, adjusting the upper portion of said box relative to said pipe member to vertically position said central axis of said upper portion, locking said upper portion of said box relative to said pipe member with said central axis of said upper portion vertically positioned, feeding electrical wires through said lower opening in said pipe member and through a sealable opening in a bottom of said connection box in preparation for mounting said light standard on said flat surface of said upper portion of said connection box.

10. The method defined in claim 9, wherein;

said pipe member is initially installed approximately in a vertical position in said ground base prior to completing final landscaping of an area to be provided with said outdoor lighting, and further comprising the step of:

trimming said upper end of said pipe member at a level of final grade of landscaping prior to inserting said connection box into said open upper end of said pipe member.

* * * * *

UNITED STATES PATENT AND TRADEMARK OFFICE
CERTIFICATE OF CORRECTION

PATENT NO. : 6,953,257 B2  Page 1 of 1
DATED : October 11, 2005
INVENTOR(S) : Pusch, Allen A.

It is certified that error appears in the above-identified patent and that said Letters Patent is hereby corrected as shown below:

<u>Title page,</u>
Insert Item -- [30]    Foreign Application Priority Data

Filed Feb. 25, 2003    (CA)    2,419,746 and
        Filed Apr. 01, 2003    (CA)    2,424,152 --.

Signed and Sealed this

Twenty-third Day of May, 2006

JON W. DUDAS
*Director of the United States Patent and Trademark Office*